United States Patent [19]
Wilbricht

[11] 3,757,675
[45] Sept. 11, 1973

[54] BARBECUE GRILL WITH TILT TOP AND SHIFTING FIRE BOX

[76] Inventor: Arthur E. Wilbricht, 1515 W. Summit, San Antonio, Tex. 78201

[22] Filed: Aug. 11, 1971

[21] Appl. No.: 170,754

[52] U.S. Cl. ............... 99/446, 99/339, 99/400
[51] Int. Cl. ................................... A47j 37/07
[58] Field of Search ............... 99/446, 324, 337, 99/339, 340–341, 357, 400, 443–444, 447; 16/25, 201, 273, 376; 239/288

[56] References Cited
UNITED STATES PATENTS

| | | | |
|---|---|---|---|
| 1,255,033 | 1/1918 | McNutt | 126/201 |
| 1,332,474 | 3/1920 | Skelly | 126/201 |
| 1,542,227 | 6/1925 | Fisher et al. | 126/201 |
| 2,895,405 | 7/1959 | Hopkins | 99/337 X |
| 2,923,229 | 2/1960 | Halford | 99/339 |
| 2,943,557 | 7/1960 | Suehlsen | 99/446 X |
| 3,358,587 | 12/1967 | Hunt et al. | 99/447 X |
| 3,380,444 | 4/1968 | Stalker | 126/25 R |
| 3,490,359 | 1/1970 | Seitz | 99/447 X |

*Primary Examiner*—Harvey C. Hornsby
*Assistant Examiner*—Arthur O. Henderson
*Attorney*—Willard J. Hodges, Jr.

[57] ABSTRACT

This invention pertains to an improved barbecue grill constructed on a welded angle iron frame. The grill incorporates expanded metal sides preventing inadvertent contact with the heated fire box. The fire box is movably mounted on angle iron cross members which serve as a fire box track permitting shifting of the box relative to the grill. A tiltable hood is mounted on wing nuts at the center of two cross members permitting a tiltable reversal of the relative position of the hood.

4 Claims, 6 Drawing Figures

Patented Sept. 11, 1973

INVENTOR
ARTHUR E. WILBRICHT

BY
ATTORNEY

INVENTOR
ARTHUR E. WILBRICHT
BY
ATTORNEY

BARBECUE GRILL WITH TILT TOP AND SHIFTING FIRE BOX

BACKGROUND OF THE INVENTION

1. Field of Invention

This invention pertains to a barbecue grill of an improved design and a new relative arrangement of components.

2. Description of Prior Art

Barbecue grills are of various designs and conformations. A usual configuration is a dish like bowl fire box with a grill supported above the fire. Another common type is an enclosed box like structure with a top enclosing a grill. These latter devices are frequently referred to as smokers.

SUMMARY OF THE INVENTION

An object of this invention was to provide a barbecue grill of more open design with improved burning characteristics.

Another object was an improved tiltable hood serving as a windscreen or smoke shield.

Another object was to provide a screened or shielded fire box not likely to be contacted by the person or their clothing.

The improved barbecue grill of this invention comprises a cubicle like frame constructed of welded angle iron. The device may be mounted on wheels for ease of movement. The lower portion of the frame supports a drip pan. The expanded metal sides surround and shield the fire box from contact by the user. Mounted above the fire box is a sheet metal grill of solid or perforated sections. The fire box is movably mounted on fire box tracks permitting movement from one side of the grill to the other side of the grill. This provides selective positions for the fire box. The reversible tiltable hood mounted on wing nuts permits a shifting of the wind screen or smoke shield from side to side. The device is well ventilated and permits positioning of the food as well as the fire box to provide varying degrees of heat.

DESCRIPTION OF THE PREFERRED EMBODIMENT

Figure 1:
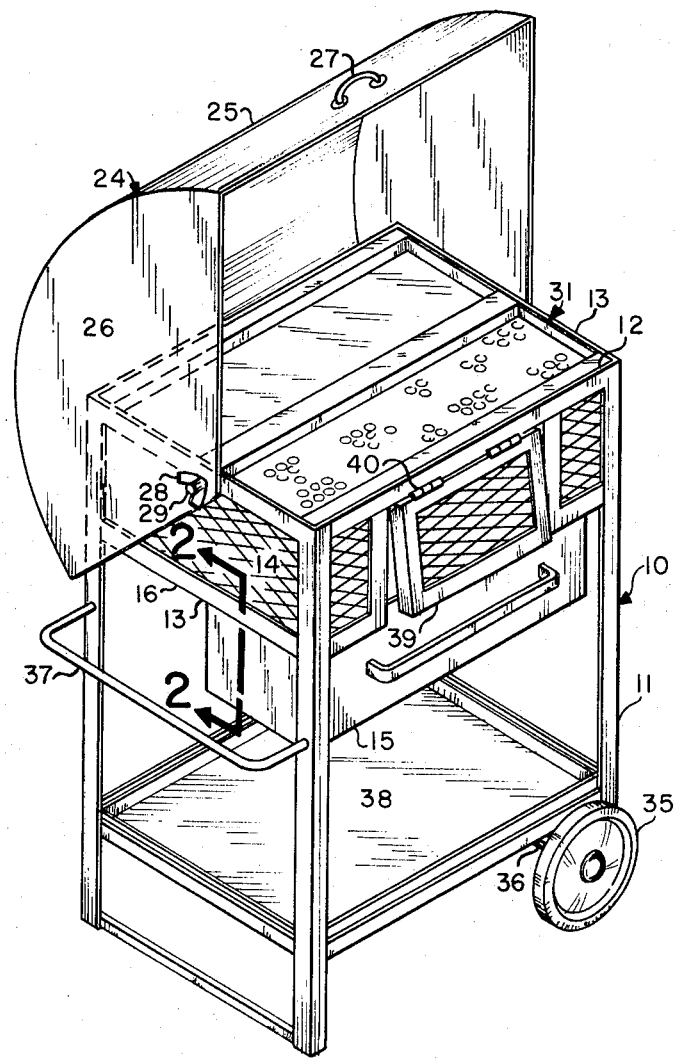
FIG. 1 is a perspective view of the assembled device disclosing the relative arrangement of the components.
Figure 2:
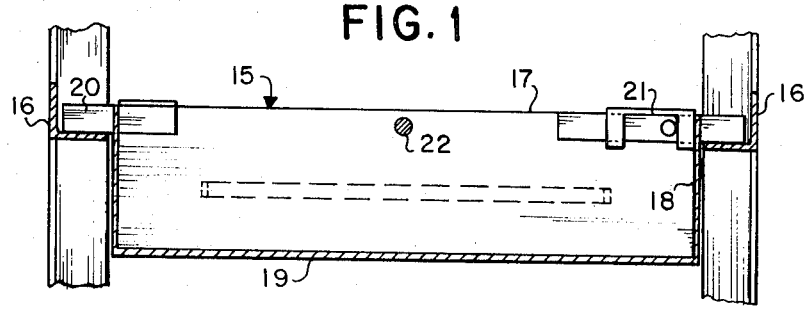
FIG. 2 is a sectional view of the fire box taken substantially on line 2—2 of FIG. 1 looking in the direction of the arrows.
Figure 3:
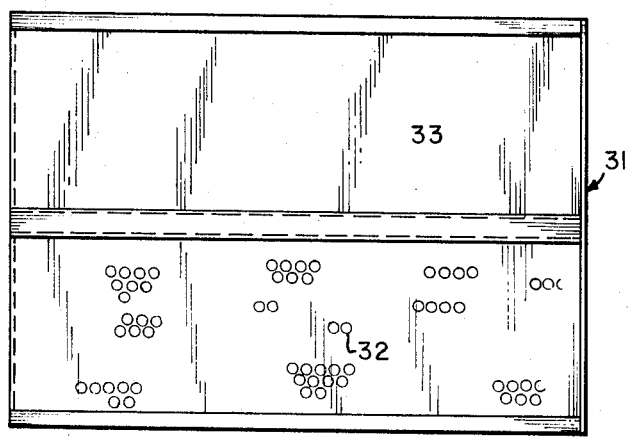
FIG. 3 is a top view of the grill which may be incorporated in the device comprising a solid section and a perforated section.
Figure 4:
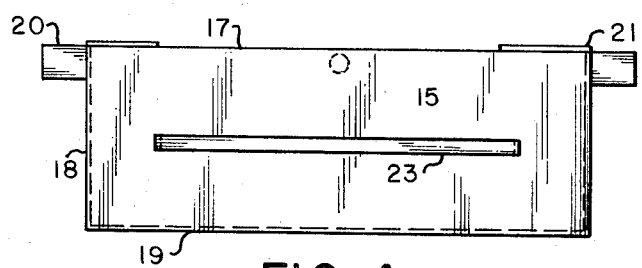
FIG. 4 is a side elevation view of the fire box.
Figure 5:
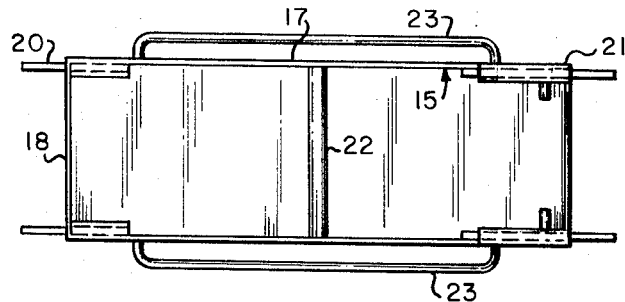
FIG. 5 is a top view of the fire box.
Figure 6:
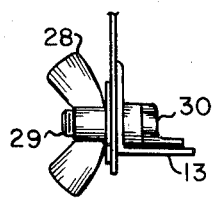
FIG. 6 illustrates the detail of the wing nut hood mount.

For a detailed description of the method of construction and utilization of the device, reference is made to the attached several views wherein identical reference characters are utilized to refer to similar or equivalent components throughout the various views and the following detailed description. Particularly referring to FIG. 1, the device of the preferred embodiment is basically constructed of a substantially cubical frame 10 which comprises elements of welded angle iron. These components comprise uprights 11, stringers 12, and cross members 13. The outer upper section of the device has welded to grill frame structure 10 expanded metal sides 14. The fire box 15 is welded sheet metal construction and in its longest dimension approximately the length of the stringers 12 and in its narrowest dimension approximately one-half the length of cross members 13. This fire box 15 is supported on two of the cross members 13 which comprise a fire box track 16. For a description of the detailed construction of the fire box 15, reference is particularly made to FIGS. 2, 4 and 5. As previously stated, fire box 15 is of welded sheet metal construction including sides 17, ends 18 and a bottom 19. Welded to one end 18 section of the fire box 15 is two rigid studs 20. At the opposite end of fire box 15 there is slidably movably secured to fire box 15 two latches 21. The studs 20 and latches 21 suspend and support the fire box 15 on the fire box tracks 16. For rigidity and convenience of handling, there may be secured at substantially the center portion of the fire box 15 a cross bar 22 projecting from side to side 17 of the fire box 15. Also, to each side 17 of the fire box may be mounted a fire box handle 23. For a description of the construction of the tiltable hood 24 and its utilization, reference is made particularly to FIG. 1 and FIG. 6. The hood 24 is of welded sheet metal construction which in the preferred embodiment employed spot welding techniques. The hood 24 comprises an arcuate hood top section 25 and two pie shaped hood ends 26. The arcuate hood top 25 and the fan like hood ends 26 encompass an arc of approximately 120°. Secured to each side of the hood top 25 were hood handles 26. The hood 24 was tiltably mounted at substantially the center of the two upper most cross members 13 by means of wing nuts 28 threadably secured to wing nut bolts 29. The opposite end of the wing nut bolt 29 from the wing nut 28 is weldably attached a lock plate 30 which is positioned in close contact to the angle iron cross member 13 which prevents rotation of the wing nut bolt 29. Supported on the uppermost stringers 12 and cross members 13 is a grill 31. This grill 31 is constructed of sheet metal which may include grill perforations 32 or might incorporate a grill solid section 33, as illustrated in FIG. 3. For ease of handling and mobility the device may have secured to its lower extremities wheels 35 which are rotatibly mounted on an axle 36. At the opposite end of the grill frame 10 from the wheels 35 there may be secured a grill frame handle 37. At the lower most level on the grill frame 10 also restably supported on the lowermost stringers 12 and cross members 13 is a substantially rectangular dish shaped drip pan 38. For ease of access to the fire box 15 there may be constructed a door 39 which in the preferred embodiment was secured to an uppermost stringer 12 by means of door hinges 40.

In utilization and operation of the improved barbecue grill of this invention as was alluded to in the objects, the fire box 15 occupies only approximately one-half of the grill 31 dimension. This permits a shifting of the fire box 15 on fire box tracks 16 selectively heating either half section of grill 31. This enables selective cooking of foods at varying degrees of temperature as well as the utilization of a portion of the grill 31 as a warming oven or to maintain or hold food at palatable temperature until the remainder of the food is cooked. Another desirable feature of the device of this invention is the expanded metal sides 14 which shield and protect the fire box 15 from inadvertent contact. While cooking with the improved barbecue grill 10 of this invention the tiltable hood 24 may be reversed from side to side to deflect the smoke or shield the fire in the fire box 15 from direct wind drafts. The method of mounting of the tiltable hood 24 permits a stopping and securing in any selected position by loosening and tightening of wing nuts 28. The particular design and construction of the device of this invention permits a locking or unlocking of the fire box 15 in numerous selected positions by means of latches 21. The device may be readily assembled and disassembled by unlatching and removing the fire box 15, lifting off drip pan 38 and grill 31 as well as removal of wing nuts 28 and wing nut bolts 29 permit the disassembly of tiltable hood 24 from grill frame 10. This feature affords ready access for cleaning as well as storage.

Having described in detail the construction of the improved barbecue grill 10 with tilt top 24 and shifting fire box 15 what is desired to be claimed is all embodiments or equivalent structures not departing from the scope of the appended claims.

I claim:

1. An improved barbecue grill comprising:
   a. a substantially cubical frame including multiple uprights, upper and lower stringers, and upper and lower cross members,
   b. said cross members comprising a fire box track,
   c. a substantially rectangular fire box, having a length and a width, slidably mounted on said fire box track, said fire box further comprising:
      1. a first and a second end portion, a first and a second side portion and a bottom portion securely attached to and maintaining in rigid space relationship together with said first and said second end portions, and
      2. a multiplicity of fire box studs securely attached to the first said end portion and multiplicity of fire box latches slidably secured to said second end portion,
   d. a grill having a length and a width with one dimension substantially greater than the corresponding dimension of said fire box, said fire box being supported by said frame, said grill being positioned above said fire box, and
   e. a hood tiltably mounted over said grill, said hood adapted to selectively tilt from side to side rotating substantially 90° thereby reversing the screening or shielding effect of said tiltable hood.

2. The invention of claim 1 comprising expanded metal sides spaced from and substantially surrounding said fire box shielding said fire box from inadvertent contact.

3. The invention of claim 1 wherein said grill comprises a solid section and a perforated section said sections being substantially proportional.

4. The invention of claim 1 comprising a drip pan of dish shaped configuration constructed and arranged to rest on and be supported by the lower most said stringers and said cross members of said substantial cubical frame.

* * * * *